United States Patent [19]

Steltzer

[11] Patent Number: 4,987,507
[45] Date of Patent: Jan. 22, 1991

[54] FLEXURE GUIDE FOR STRAIGHT-LINE MOTION

[75] Inventor: Edward L. Steltzer, Westborough, Mass.

[73] Assignee: Digital Equipment Corporation, Maynard, Mass.

[21] Appl. No.: 317,987

[22] Filed: Mar. 2, 1989

[51] Int. Cl.$^5$ .............................................. G11B 5/48
[52] U.S. Cl. .................................. 360/106; 360/104; 360/109
[58] Field of Search ............................... 360/102–106

[56] References Cited

U.S. PATENT DOCUMENTS

| | | | |
|---|---|---|---|
| 4,286,297 | 8/1981 | Root et al. | 360/103 |
| 4,291,350 | 9/1981 | King et al. | 360/104 |
| 4,724,500 | 2/1988 | Dalziel | 360/104 X |

OTHER PUBLICATIONS

IBM/TDB vol. 19, No. 9; Feb. 1977, pp. 3577–3578, Rectilinear Motion Suspension for Magnetic Heads by Watrous.
IBM/TDB vol 29, No. 5, Oct. 1986, pp. 1933–1934, "Floating Retention of Gimbal Spring".

Primary Examiner—John H. Wolff
Attorney, Agent, or Firm—Kenyon & Kenyon

[57] ABSTRACT

An apparatus that guides an object in a straight line path of motion employing two leaf springs which lie side by side in their unflexed state in a plane perpendicular to the direction of motion of a moving part. One end of one spring is coupled to the moving part. The other end of the spring and one end of the second spring are coupled together in a free floating fashion. The second end of the second spring is coupled to the frame of the machine. As the moving part travels, the two springs bend in identical but opposite directions, canceling out any deflection or decrease in the lengths of the springs caused by the springs' flexing action. Even when the springs are flexed, they remain in a plane parallel to one another and perpendicular to the plane of the moving part. The moving part is coupled on one end to a conventional guiding device which confines the moving part to a plane parallel to the frame of the machine. The stiffness of the springs and the connection of the moving part to a guide allows the moving part to travel without any undesired tilting, and since the springs are coupled together in a free floating fashion, the moving part can travel in its straight line path without any friction.

24 Claims, 3 Drawing Sheets

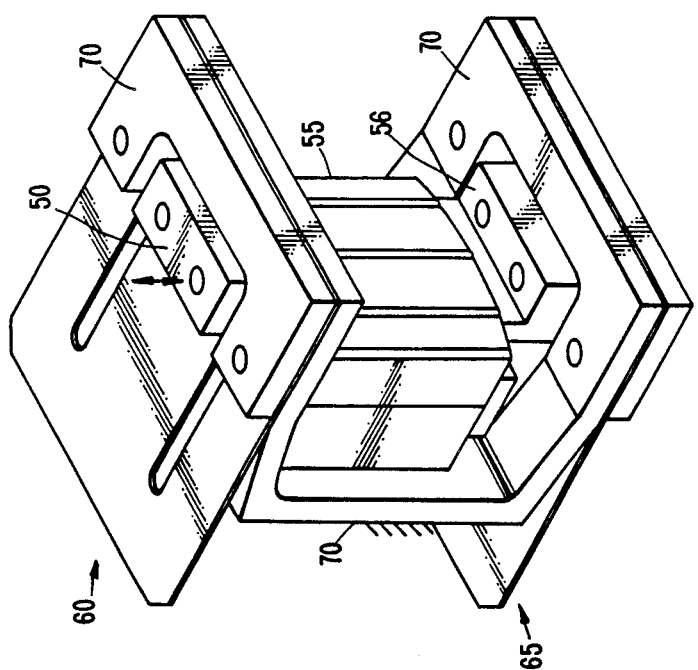
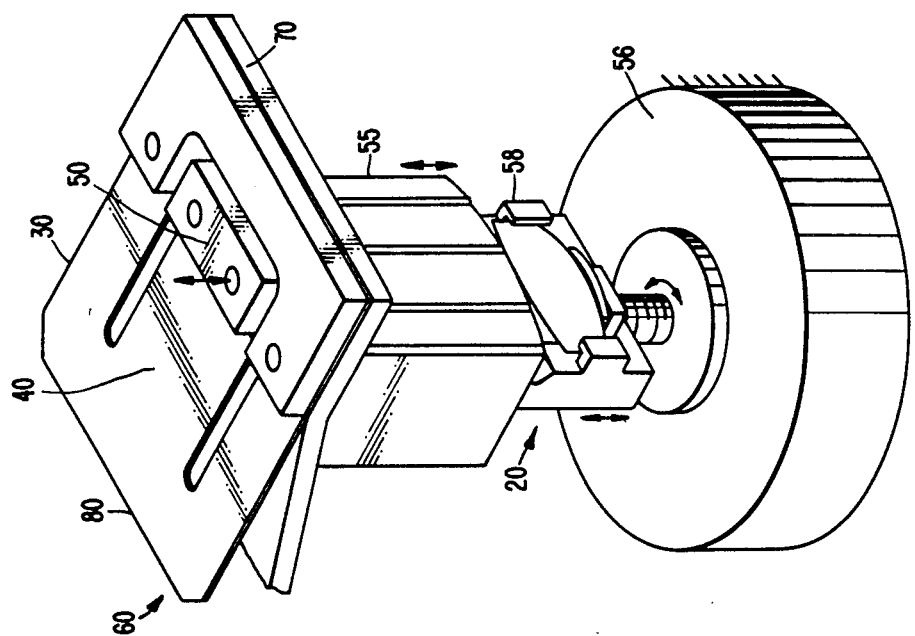

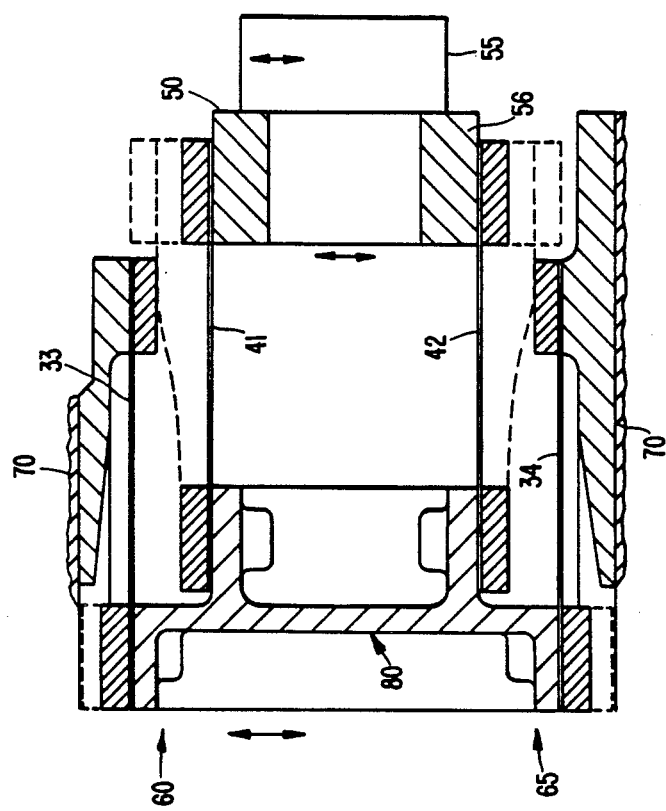
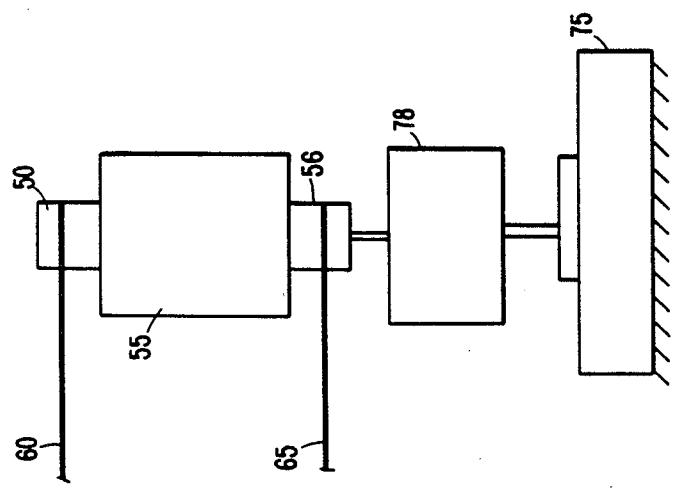

FLEXURE GUIDE FOR STRAIGHT-LINE MOTION

FIELD OF INVENTION

This invention relates to flexure guides, and, more particularly, to a guide which constrains a moving part to a straight line path within a desired range of motion.

BACKGROUND OF INVENTION

In numerous fields of technology, it is often desirable, and sometimes necessary, to limit a moving part to straight line motion.

One particular application is in data storage systems. For example, with tape drives, the recording head moves back and forth across the width of the recording tape. Guiding the recording head in a linear path is critical to retrieving accurate information from storage tracks.

There are many known arrangements for guiding a movable part linearly. A common arrangement couples the moving part to parallel posts so that the moving part is constrained to a straight line path. The moving part is coupled to parallel posts by brackets which surround the posts. In this design, free motion is achieved by designing the dimensions of the brackets so that their circumference is slightly larger than that of the posts. This clearance enables the moving part to freely move along the posts.

However, this clearance between the bracket and posts, regardless of how slight it is, creates a looseness which often allows the moving part to tilt slightly while in motion. In some applications, particularly where accuracy is critical, this clearance may prohibit the retrieval of accurate data.

Another problem with the above arrangement is that friction results as the brackets coupled to the moving part move along the posts. Because the brackets must retain some closeness to the posts to enable the moving part to remain stationary when necessary, the moving part is prevented from moving smoothly along its direction of motion. Particularly where small motion increments are required, as with the retrieval of data from storage systems, friction can cause the retrieval of inaccurate information. Although there are antifriction linear bushings available, they still possess some friction and are fairly costly.

Other devices in the prior art attempt to approximate straight line motion by using linkages. There are inherent inaccuracies and clearances associated with these devices that cannot be tolerated when accuracy and speed are critical.

As capacities of storage systems increase, the use of a magnetic head guide which creates straight-line mechanical motion and has an improved accuracy when handling these higher capacities will be necessary.

The problem presented by the prior art is to provide an arrangement that guides a moving part in a straight line motion path, without the tilting of the part, or the creation of sliding friction as the part moves.

SUMMARY OF INVENTION

The above problems are solved by the present invention which provides a straight motion guide having two springs possessing identical spring characteristics and which are serially coupled to each other at one end and remain free floating. The other end of one of the two springs is connected to a moving object and the other end of the second spring is attached to a fixed object, i.e. the machine.

As the moving part travels, the two springs bend in equal but opposite directions, canceling out any undesired deflection. This flexing of the springs allows the moving part to freely move along a linear path with nearly negligible hysteresis and no actual sliding. The stiffness of the spring in combination with a conventional guide connected to one end of the moving part forces the moving part to remain in a plane parallel to the fixed object and thus prevents the moving part from rotating in an undesired manner.

BRIEF DESCRIPTION OF THE DRAWINGS

FIG. 5 illustrates the application of the present invention for use with a tape drive.

FIG. 6 illustrates the use of dual embodiments of the present invention for use with a tape drive.

FIG. 7 is a side view of the present invention, according to the embodiment of FIG. 6, illustrating the connection of a motor which drives the head of the tape drive.

FIG. 8 illustrates a more compact embodiment of the present invention as illustrated in FIG. 6.

DETAILED DESCRIPTION

Figure 1:
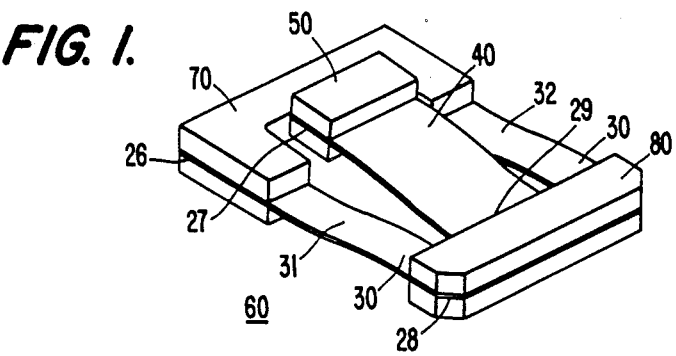
FIG. 1 is an isometric view of an embodiment of the present invention, illustrating the moving part displaced from its original position.

Referring to FIG. 1, a guide 60 includes a pair of flat leaf springs or flexures 30,40 serially arranged in a plane perpendicular to the required direction of motion. The spring 30 and the spring 40 have identical flexing characteristics. A supported moving part 50 is coupled to one end 27 of spring 40. The moving part 50 can be moved in a plane perpendicular to the plane in which the springs 30,40 lie.

One of the two springs 30 may be divided into two equal halves 31,32 to provide for better balance for the guide 60. This is illustrated in the exemplary embodiment of FIG. 1. One end 26 of each half 31,32 of the divided spring 30 is coupled to the frame of the machine 70.

Figure 2:
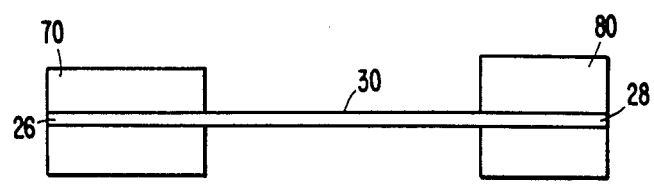
FIG. 2 is a side view of the present invention, according to the embodiment of FIG. 1, with the moving part at its original position.

One end 27 of the second spring 40 is attached to the moving part 50. The other ends 28,29 of the two springs 30,40 are coupled together by a coupling element 80, which is not connected to anything else. As shown in FIG. 2, the two springs 30,40 lie in the same plane and are side by side when in the unflexed position.

Figure 3:
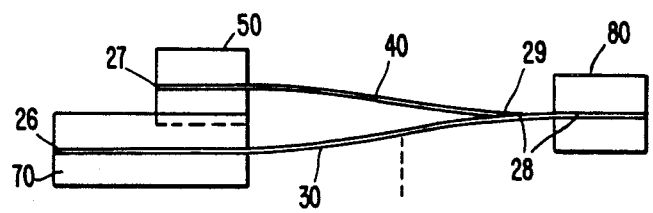
FIG. 3 is a side view of the present invention, according to the embodiment of FIG. 1, with the moving part vertically displaced from its original position.
Figure 4:
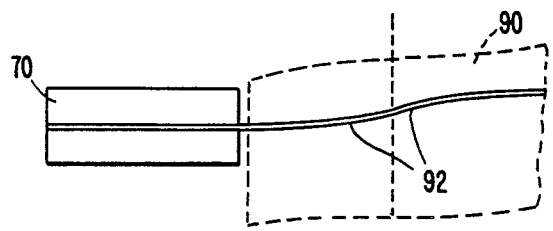
FIG. 4 illustrates the flexing shape of the spring as the moving part is displaced.

FIGS. 3 and 4 illustrate the operation of the guide 60 as the moving part 50 moves in a straight- line. During the motion, the two springs 30,40 are each bent into an "S" or "Ogee" shape 90 (FIG. 4). When the spring 30 or 40 bends, each half 92 of each spring 30,40 assumes the same shape as a cantilever beam which is point loaded at its end so that the bending moment in each spring 30,40 is maximum at its end and zero at its midpoint. FIG. 4 illustrates the shape of the spring 30 when the moving part 50 is displaced from its original position. The shape of the spring 40, not shown, when the moving part is displaced, would be the mirror-image of the shape of the spring 30 in FIG. 4.

As the moving part 50 travels in a straight linear path, the ends 26,27,28,29 of the two springs 30,40 all remain parallel to their original plane. Since the two ends 28,29 of the two springs 30,40 are attached to each other by the coupling element 80 in a free floating fashion, the deflected shapes of the two springs 30,40 are mirror images of each other. Consequently, although the bending of each spring 30,40 slightly reduces the overall length of the springs 30,40 in the horizontal direction, the reduction is equal and opposite in the two springs 30,40 and is thus canceled out. This allows the moving part 50 to travel a straight path perpendicular to the plane of the guide 60.

The springs 30,40 in the described embodiment are made with stainless steel. Although other materials could be used, the spring material should be of such a nature to cause the springs 30,40 to remain very stiff in directions parallel to their plane to provide good linear guidance. Since the springs 30,40 are coupled to one another in a free floating fashion, the moving part 50 travels in a straight linear path, perpendicular to the plane in which the springs 30,40 lie, and is free from any friction.

The invention described above can be used in various applications requiring straight linear motion. A brief example describing the use of the invention with respect to a tape drive now follows.

As shown in FIG. 5, the moving part 50 is coupled to one side of the magnetic recording head 55 of the tape drive. The other side of the magnetic recording head 55 is coupled to a conventional mechanism 20 such as a preloaded nut/guide 58 which guides one end of the head 55 in its desired path to retrieve or store data along the tracks of the tape. The preloaded nut/guide 58 constrains the bottom of the head 55 to a linear path, but does not necessarily provide any angular guiding. With the preloaded nut guide 58 attached to the magnetic recording head 55, the head 55 will remain in a plane parallel to the plane of the frame of the machine 70. The preloaded nut/guide 58 moves the magnetic recording head 55 in a general up and down direction and prevents rotation around the travel centerline while the flexure guide 60 constrains the motion of the magnetic recording head 55 in an accurate straight line motion path. The force to move the magnetic head 55 across the track is provided by a motor 56 coupled to the preloaded nut/guide 58.

As the force of the motor 56 drives the recording head 55 across the various tracks of the tape to its designated position, the spring 40 bends in an upward or downward direction, depending on the direction the head 55 moves from its original position. The spring 40 bends at a degree dependent on the distance that the moving part 50 has been displaced by the movement of the head 55. When the spring 40 coupled to the moving part 50 flexes, the spring 30, which is connected to the stationary frame 70 of the tape drive, will also bend an equal degree but in a direction opposite to the bend of the spring 40. This will cancel out any deflection or decrease in the length of the springs 30, 40.

Coupling the moving part 50 to one end of the head 55 enables the magnetic recording head 55 to traverse the width of the tape drive to retrieve data from and store data on the tracks of the tape drive accurately and without the friction presented by the prior art. The preloaded nut/guide 58 prevents the moving part 50 from twisting out of its original plane by constraining the moving part 50 to a plane parallel to its original plane. This enables the moving part 50 to guide the head 55 from each track location to the next in a straight linear path without the disadvantages of friction or the tilting of the head 55.

Although in FIG. 5, a preloaded nut/guide 58 is shown as coupled to one end of the magnetic recording head 55, as shown in FIG. 6, the preloaded nut/guide 58 can be replaced by a second flexure guide 65, identical to the first flexure guide 60 which is arranged to lie below the first flexure guide 60 in a parallel plane. This arrangement provides greater stability and less possibility for the head to tilt in an undesired manner.

The head 55 is connected on one side to moving part 50 of guide 60 and on the other side to moving part 56 of guide 65. The head 55 thus traverses the tape by the guidance of the two guides 60,65. Like the preloaded nut/guide 58, the second flexure guide 65 moves the recording head in a general up and down direction and confines the magnetic recording head 55 to a plane parallel to the frame 70 of the tape drive. As shown in FIG. 7, the force to move the head 55 is provided by a non-guiding floating nut/leadscrew 78 connected to a motor 75.

For some applications, the structure of the straight line motion guide of FIG. 6 may be unsuitable. FIG. 8 illustrates a mounting kinetically identical to that of FIG. 6, but which is more compact.

The springs 30,40 are divided into two equal halves 33,34,41,42. The springs 33,34,41,42 are serially arranged in a plane perpendicular to the plane of motion of the magnetic head 55. In the first flexure guide 60, the springs 33,41 are arranged to lie above one another in parallel planes. One end of the spring 41 is coupled to a moving part 50 which is coupled to one side of the head 55. The other end of spring 41 is coupled to one end of spring 33, by a coupling element 80, and is not connected to anything else. The other end of the spring 33 is coupled to the frame of the tape drive 70.

Similarly, with the second flexure 65, the springs 34,42 are arranged to lie above one another in parallel planes. One end of the spring 42 is coupled to a moving part 56 which is coupled to the magnetic recording head 55. The other end of spring 42 is coupled together with one end of spring 34, by a coupling element 80, and is not attached to anything else. The other end of spring 34 is attached to the frame 70 of the tape drive.

In FIG. 8, all four spring 33,41,34,42, lie on top of one another in planes parallel to one another and perpendicular to the direction of motion of the head 55. As the magnetic head 55 is guided in its direction of motion, the springs 41,42 flex in the same direction as the movement of the head 55. When the springs 41,42 coupled to this head 50 flex, springs 33,34, which are connected to the stationary frame 70 of the tape drive, will also bend an equal degree but in a direction opposite the bend of springs 41,42. This will cancel out any deflection and decrease in the length of the springs 33,41,34,42.

The guides 60,65 thus constrain the head 55 to a straight line motion path while employing a mounting structure that is compact and suitable for many applications.

What is claimed is:

1. An apparatus for moving a first object in a straight line with respect to a second object, comprising:

a. a first spring having first and second ends, said first end of said first spring being coupled to said first object; and
b. a second spring having first and second ends, said first end of said second spring being coupled to said second object;
c. wherein said first and second springs have identical spring characteristics, and the second ends of said first and second springs are serially coupled to each other;
d. wherein said second spring is separated into two equal halves which are arranged on opposite sides of said first spring.

2. The apparatus of claim 1, wherein said first and second springs lie in a common plane in an unstressed state and wherein said straight line is perpendicular to said common plane.

3. The apparatus of claim 1, wherein said first and second springs are leaf springs.

4. The apparatus of claim 1, wherein said first and second springs are made of stainless steel.

5. The apparatus of claim 1, further comprising a coupling element which couples said second ends of said first and second springs together, wherein said coupling element is free floating.

6. The apparatus of claim 1, wherein said first and second springs are arranged to flex in opposite directions as said first object moves in a direction of motion perpendicular to said plane in which said springs lie and wherein a bending moment in said first and second springs is maximum at said first and second ends of said first and second springs and zero at the centers of said first and second springs.

7. A storage device having a stationary frame comprising:
   a. a magnetic recording head having first and second ends;
   b. a guide device, which prevents said magnetic recording head from tilting, by constraining said magnetic recording head to a linear path said guide device having a first and second end, said first end of said guide device coupled to said first end of said magnetic recording head;
   c. a motor coupled to said second end of said guide device, which drives said magnetic recording head;
   d. a first flexure guide coupled to said stationary frame and said magnetic recording head which guides said magnetic recording head in a straight line with respect to said frame of said storage device, said first flexure guide having;
      (1) a first spring with first and second ends, said first end of said first spring being coupled to said magnetic recording head, and
      (2) a second spring with first and second ends, said first end of said second spring being coupled to said frame of said storage device,
      (3) wherein said first and second springs have identical spring characteristics and wherein said second ends of said first and second springs are serially coupled to each other,
      (4) wherein said second spring is separated into two equal halves which are arranged on opposite sides of said first spring.

8. The storage device of claim 7, wherein said first and second springs of said first flexure guide are arranged to lie in a common plane in an unstressed state and wherein said straight line on which said magnetic recording head is guided is perpendicular to said common plane.

9. The storage device of claim 8, wherein said guide device is a second flexure guide which is coupled to said stationary frame and said magnetic recording head said second flexure guide to be physically opposite said first flexure guide in a plane parallel to the common of said first straight line motion guide.

10. The storage device of claim 9, wherein said first and second springs of said first and second flexure guides are leaf springs.

11. The storage device of claim 9, wherein said first and second springs of said first and second flexure guides are made of stainless steel.

12. The storage device of claim 9, further comprising a coupling element which couples said second ends of said first and second springs of said first and second flexure guides together, wherein said coupling element is free floating.

13. The storage device of claim 9, wherein said first and second springs of said first and second flexure guides are arranged to flex in opposite directions as said recording head moves in a direction of motion perpendicular to the plane in which said springs lie, and wherein a bending moment in said first and second springs is maximum at said first and second ends of said first and second springs and zero at the centers of said first and second springs.

14. The storage device of claim 7, wherein said first and second springs of said first flexure guide are leaf springs.

15. The storage device of claim 7, wherein said first and second springs of said first straight line motion guide are made of stainless steel.

16. The storage device of claim 7, further comprising a coupling element which couples said second ends of said first and second springs of said first flexure guide together, wherein said coupling element is free floating.

17. The storage device of claim 7, wherein said first and second springs of said first flexure guide are arranged to flex in opposite directions as said magnetic recording head moves in a direction of motion perpendicular to the plane in which said springs lie and wherein a bending moment in said first and second springs is maximum at said first and second ends of said first and second springs and zero at the centers of said first and second springs.

18. The storage device of claim 7, wherein said guide device is a preloaded nut guide.

19. A storage device having a stationary frame comprising:
   a. a magnetic recording head;
   b. a motor coupled to said magnetic recording head which drives said magnetic recording head; and
   c. a first flexure guide and a second flexure guide, said second flexure guide to be physically opposite said first flexure guide, wherein each flexure guide is coupled to said stationary frame and said magnetic recording head and wherein each flexure guide has:
      (1) a first spring with first and second ends, said first end of said first spring being coupled to said magnetic recording head, and
      (2) a second spring with first and second ends, said first end of said second spring being coupled to said frame of the storage system,
      (3) wherein said first and second springs have identical spring characteristics and wherein said second ends of said first and second springs are serially coupled to each other, (4) wherein said first and second springs are arranged to be physically opposite one another in planes parallel to one another, and (5) wherein said magnetic recording head moves along a line perpendicular to parallel planes in which said first and second springs lie.

20. The storage device of claim 19, wherein said first and second springs of said first and second flexure guides are leaf springs.

21. The storage device of claim 19, wherein said first and second springs of said first and second flexure guides are made of stainless steel.

22. The storage device of claim 19, further comprising a coupling element which couples said second ends of said first and second springs of said first and second flexure guides together, wherein said coupling element is free floating.

23. The storage device of claim 19, wherein said first and second springs of said first and second flexure guides are arranged to flex in opposite directions as said recording head moves in a direction of motion perpendicular to the plane in which said springs lie, and wherein a bending moment in said first and second springs is maximum at said first and second ends of said first and second springs and zero at the centers of said first and second springs.

24. The device having a stationary frame comprising:
a. a first object;
b. a second object coupled to said first object which drives said first object; and
c. a first flexure guide and a second flexure guide, said second flexure guide arranged to be physically opposite said first flexure guide, and wherein each flexure guide is coupled to said stationary frame and said first object and wherein each flexure guide has:

(1) a first spring with first and second ends, said first end of said first spring being coupled to said first object, and (2) a second spring with first and second ends, said first end of said second spring being coupled to said frame of the device, (3) wherein said first and second springs have identical spring characteristics and wherein said second ends of said first and second springs are serially coupled to each other, (4) wherein said first and second springs are arranged to lie on top of one another in planes parallel to one another, and (5) wherein said first object moves in a plane perpendicular to the parallel planes in which said first and second springs lie.

* * * * *